United States Patent
Suga

(10) Patent No.: US 8,356,121 B2
(45) Date of Patent: Jan. 15, 2013

(54) COMMUNICATION CONTROL DEVICE AND COMMUNICATION CONTROL METHOD IN AUDIO VISUAL DEVICE SYSTEM, AND TELEVISION RECEIVER

(75) Inventor: Kazumi Suga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/490,663

(22) Filed: Jun. 7, 2012

(65) Prior Publication Data

US 2012/0246349 A1 Sep. 27, 2012

Related U.S. Application Data

(62) Division of application No. 12/425,194, filed on Apr. 16, 2009, now Pat. No. 8,214,555.

(30) Foreign Application Priority Data

Apr. 25, 2008 (JP) ................................. 2008-115997

(51) Int. Cl.
*G06F 3/00* (2006.01)
*G06F 13/00* (2006.01)

(52) U.S. Cl. .......... 710/15; 710/2; 710/5; 710/8; 710/33

(58) Field of Classification Search ........................ None
See application file for complete search history.

(56) References Cited

U.S. PATENT DOCUMENTS

2008/0270636 A1* 10/2008 Hong et al. ........................ 710/9
2009/0210539 A1* 8/2009 Funabiki et al. .............. 709/228

* cited by examiner

*Primary Examiner* — Scott Sun
(74) *Attorney, Agent, or Firm* — Cowan, Liebowitz & Latman, P.C.

(57) ABSTRACT

A communication control device in an audio visual device system has disconnection detection unit for detecting that an audio visual device is disconnected from the audio visual device system, device detection unit for detecting an audio visual device which has not acquired a logical address according to a device type, and control unit for performing control for causing the audio visual device without a logical address to acquire a logical address, when disconnection of a audio visual device is detected by the disconnection detection unit. With this configuration, in an audio visual device system in which an upper limit is set to the number of logical addresses according to a device type, it is possible to cause an audio visual device which cannot acquire a logical address according to the device type to acquire a logical address when it is made available.

15 Claims, 15 Drawing Sheets

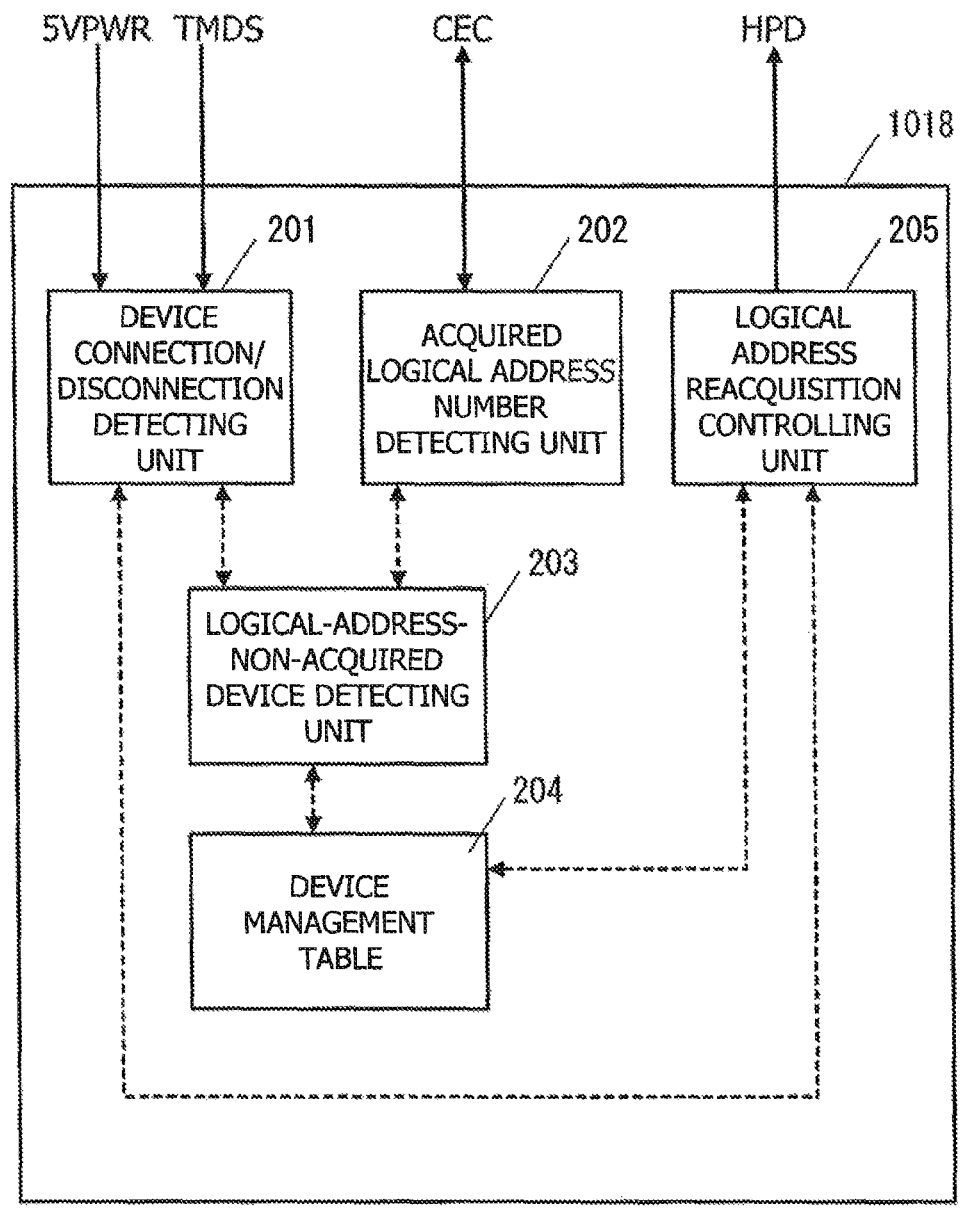

*Fig. 4A*

| Header/Data Block |||||||||||
|---|---|---|---|---|---|---|---|---|---|
| 7 | 6 | 5 | 4 | 3 | 2 | 1 | 0 | - | - |
| Information bits |||||||| EOM | ACK |

*Fig. 4B*

| Header Block |||||||||||
|---|---|---|---|---|---|---|---|---|---|
| 3 | 2 | 1 | 0 | 3 | 2 | 1 | 0 | - | - |
| Initiator |||| Destination |||| EOM | ACK |

Fig. 15

| Address | Device |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered (as initiator address) Broadcast (as destination address) |

COMMUNICATION CONTROL DEVICE AND COMMUNICATION CONTROL METHOD IN AUDIO VISUAL DEVICE SYSTEM, AND TELEVISION RECEIVER

CROSS-REFERENCE TO RELATED APPLICATION

This application is a divisional of application Ser. No. 12/425,194, filed Apr. 16, 2009, the entire disclosure of which is hereby incorporated by reference.

BACKGROUND OF THE INVENTION

1. Field of the Invention

The present invention relates to a communication control device and a communication control method in an audio visual device system, and a television receiver.

2. Description of the Related Art

In HDMI (High-Definition Multimedia Interface), since it is possible to recognize devices connected to each other, the devices can be controlled and caused to cooperate with each other in addition to that video and audio signals can be transferred through a cable. Data transmission/reception and communication (refer to "High-Definition Multimedia Interface Specification 1.3a") of a system in which a television receiver (TV receiver) is connected to recording devices such as a hard disc recorder through HDMI will be explained using a block diagram of FIG. 13 and a timing chart of FIG. 14.

First, a procedure for recording devices 902, 903 to acquire physical addresses will be explained. When the recording devices 902 and 903 set 5V PWR (+5V power supply) lines to high, the TV receiver 901 sets an HPD (Hot-Plug Detect) line to high. It is found that the recording devices 902, 903 can perform a DDC (Display Data Channel) communication by these operations. Thereafter, the recording device 902 or 903 acquires a physical address from an EDID (Extended Display Information Data)-ROM (not shown) of the TV receiver 901 by a DDC communication. DDC is a standard determined by VESA (Video Electronics Standards Association) to transmit information as to display stored in the EDID-ROM to a display data transmission side by communication. Here, the physical address of the TV receiver 901 is fixed to 0.0.0.0. The physical addresses of the recording devices 902 and 903 are prescribed in the EDID-ROMs connected to respective HDMI ports of the TV receiver 901 and are set to, for example, 1.0.0.0 and 2.0.0.0.

Subsequently, when the TV receiver 901 switches an input and selects the recording device 902 as an external input, the recording device 902 communicates with HDCP-ROM of the TV receiver 901 by the DDC communication. With this operation, an authentication process as to copyright protection is performed, and a cipher key is provided. Thereafter, the recording device 902 can transmit image data and audio data to the TV receiver 901.

Next, a method of acquiring a logical address will be explained. Logical addresses which can be acquired are previously determined for each of device types (refer to FIG. 15). For example, the logical addresses of the recording devices are set to any of "1", "2", "9". Accordingly, the number of logical addresses of each device type has an upper limit allocated thereto. The recording device 902 transmits, by broadcast, a Polling message to a logical address (for example, "1") the acquisition of which is desired by the recording device 902. When no response to the message returns from any device (when a message returns in the state of ACK bit=1), it can be found that the logical address is available, and the recording device 902 acquires the logical address. When a response returns (when a message of ACK bit=0 returns), on the other hand, the logical address is already acquired by other device. In this case, a logical address is acquired by repeating the same process to other logical addresses (for example, "2" and "9") (refer to, for example, Japanese Patent Application Laid-Open Publication No. 2007-202115 and "High-Definition Multimedia Interface Specification, Version 1.3a, P. 194-197"). FIG. 14 shows timings at which the processes described above are performed. In FIG. 14, a horizontal axis shows a time, and a vertical axis shows how the processes are time-sequentially performed from left to right.

SUMMARY OF THE INVENTION

However, when, for example, a fourth recording device is connected, since three recording devices have already acquired all the logical addresses ("1", "2", "9" for recording devices), there is no logical address which can be acquired by the fourth recording device. Accordingly, since the fourth recording device remains unable to acquire a logical address, it cannot be placed in a state in which a CEC control can be performed.

Further, since a logical address is acquired at the time when a device is connected, even if a logical address is made available after any of the three recording devices is disconnected, the fourth recording device cannot acquire the logical address.

These problems are not unique to a recording device but occur in other type of audio visual devices (receiving device, replay device, acoustic device, and the like). Although explanation is made here as to an HDMI system as an example, these problems are applied not only to the HDMI system but also to audio visual systems in general in which an upper limit is set to the number of logical addresses to be allocated according to a device type.

Accordingly, an object of the present invention is to cause an audio visual device, which cannot acquire a logical address according to a device type, to acquire a logical address when it is made available in an audio visual device system in which an upper limit is set to the number of logical addresses according to the device type.

To solve the above problems, the first aspect of the present invention relates to a communication control device in an audio visual device system, the system being arranged such that logical addresses according to device types are allocated to connected audio visual devices, an upper limit is set to the number of allocatable logical addresses of each of the device types, and when audio visual devices whose number exceeds the upper limit are connected, logical addresses according to the device types are not allocated thereto, wherein the communication control device includes:

a device detection unit for detecting the audio visual devices which has not acquired logical addresses according to the device types among a plurality of audio visual devices connected to the audio visual device system;

a disconnection detection unit for detecting that an audio visual device is disconnected from the audio visual device system; and a control unit for performing control for causing the audio visual device which is detected by the device detection means and has not acquired a logical address according to the device type, to acquire the logical address according to the device type, when the disconnection detection unit detects that an audio visual device is disconnected.

The second aspect of the present invention relates to a television receiver according to the present invention includes:

a tuner unit for receiving a television broadcast signal;
a display unit for displaying a received television broadcast signal; and
the above-described communication control device.

Further, the third aspect of the present invention relates to a communication control method in an audio visual device system, the system being arranged such that logical addresses according to device types are allocated to connected audio visual devices, an upper limit is set to the number of allocatable logical addresses of each of the device types, and when audio visual devices whose number exceeds the upper limit are connected, logical addresses according to the device types are not allocated thereto, wherein the communication control method includes:

a device detection step of detecting the audio visual devices which have not acquired logical addresses according to the device types of a plurality of audio visual devices connected to the audio visual device system;

a disconnection detection step of detecting that an audio visual device is disconnected from the audio visual device system; and a control step of performing control for causing the audio visual device which is detected in the device detection step and has not acquired a logical address according to the device type, to acquire the logical address according to the device type, when the disconnection of an audio visual device is detected in the disconnection detection step.

According to the present invention, in an audio visual device system in which an upper limit is set to the number of logical addresses according to a device type, it is possible to cause an audio visual device, which cannot acquire a logical address according to the device type, to acquire a logical address when it is made available.

BRIEF DESCRIPTION OF THE DRAWINGS

FIG. 3 is a block diagram explaining a communication control unit according to a first embodiment;

FIGS. 4A and 4B are views showing a structure of a header block/data block of a CEC message, wherein FIG. 4A is a view showing a basic structure common to the header block/data block, and FIG. 4B is a view showing a detailed structure of a header block;

FIG. 15 is a view showing a logical address determined by a device type in the HDMI standard.

DESCRIPTION OF THE EMBODIMENTS

First Embodiment

Figure 1:
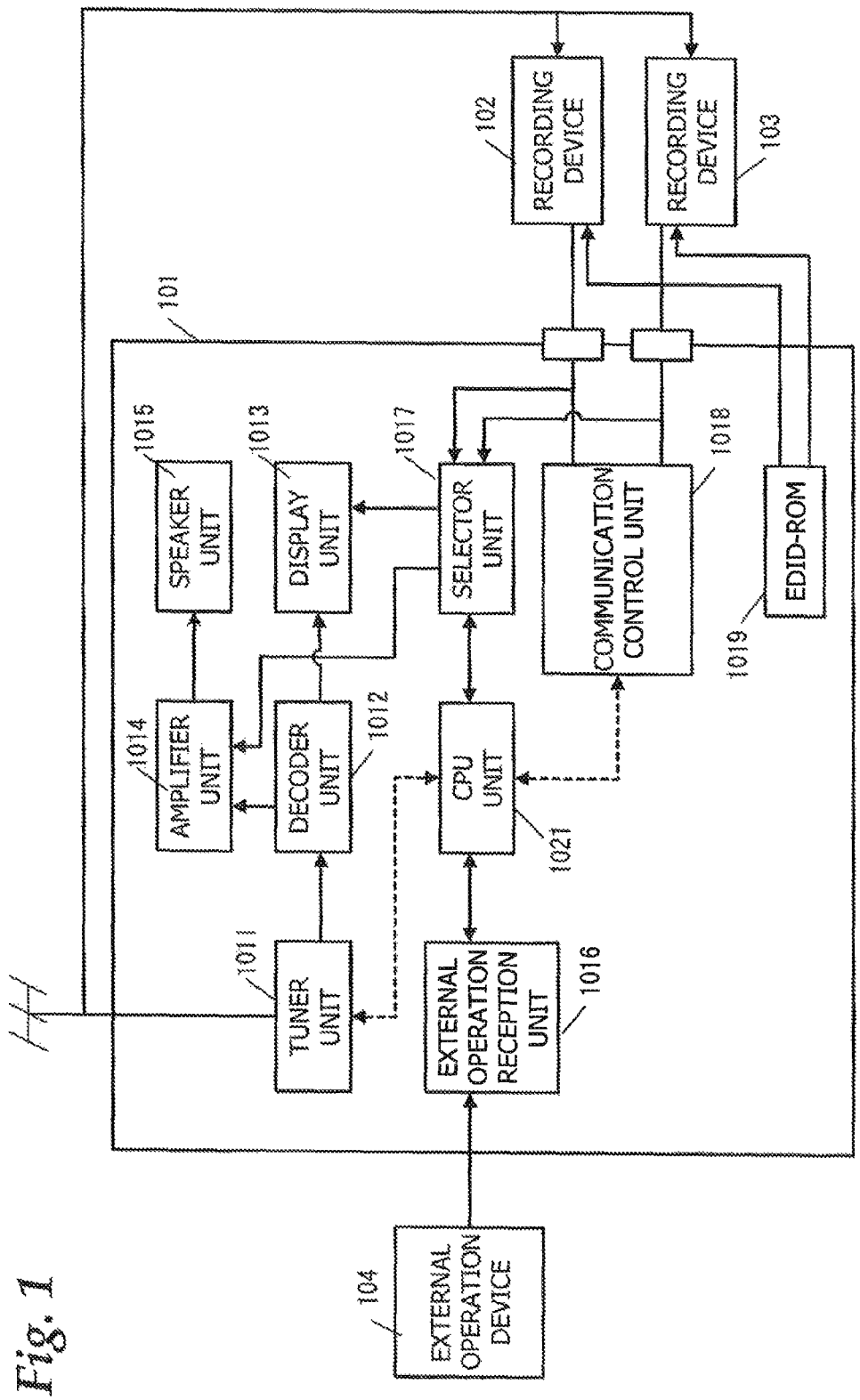
FIG. 1 is a block diagram explaining an overall configuration according to an embodiment of the present invention.

A first embodiment of the present invention will be explained referring to the drawings.

Figure 2:
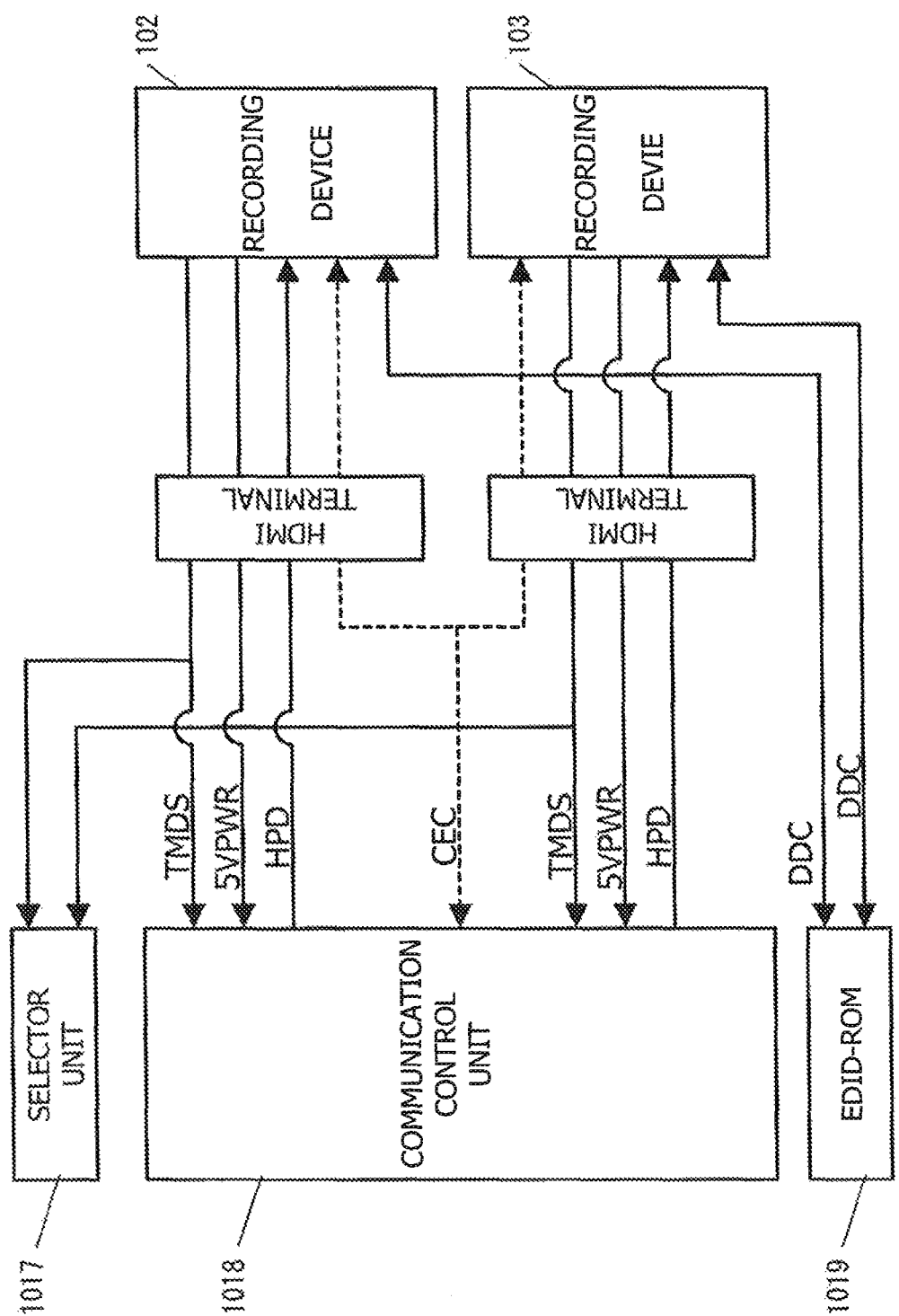
FIG. 2 is a view explaining a connecting portion between a television receiver and a peripheral device in the embodiment of the present invention.

FIG. 1 is a block diagram explaining a configuration of an audio visual (AV) device system according to the first embodiment. As shown in FIG. 1, the audio visual device system is composed of a television receiver 101, recording devices 102, 103, and an external operation device 104. The television receiver 101 is composed of a tuner unit 1011, a decoder unit 1012, a display unit 1013, an amplifier unit 1014, a speaker unit 1015, an external operation reception unit 1016, a selector unit 1017, a communication control unit 1018, and an EDID-ROM 1019. FIG. 2 shows an enlarged view of a connecting portion where the television receiver 101 is connected to the recording devices 102, 103. Further, as shown in FIG. 3, the communication control unit 1018 according to the embodiment is composed of a device connection/disconnection detecting unit 201, an acquired logical address number detecting unit 202, a logical-address-non-acquired device detecting unit 203, a device management table 204, and a logical address reacquisition controlling unit 205.

Note that although an example that the television receiver 101 has only two HDMI terminals and two devices are connected thereto will be explained here, it is apparent that the television receiver 101 may have three or more HDMI terminals.

<Gist of First Embodiment>

The first embodiment assumes a system based on the HDMI standard as an audio visual device system. Further, the first embodiment assumes that a device, which is connected to the system, does not perform any process after a plurality of audio visual devices (hereinafter, also simply called devices) having the same device type acquire logical addresses before the device acquires one of the logical addresses and thus the device fails to acquire it. More specifically, the first embodiment assumes that when a device, which is connected to the system, fails to acquire a logical address according to a device type, it does not acquire any other logical address.

In the embodiment, when the number of logical addresses, which are acquired by the respective devices connected to the HDMI terminals of the television receiver 101, is less than the number of the devices actually connected to the HDMI terminals, it is detected whether a device, which acquires no logical address, exists. When it is detected that a device is disconnected, the device without an acquired logical address is controlled such that it is caused to acquire the logical address again.

With this operation, it is possible for the device which has failed to acquire a logical address to acquire the logical address again and to become controllable via CEC when a logical address of the device type becomes available.

This will be explained in detail referring to block diagrams of FIGS. 1 and 2.

(Tuner Unit)

A television broadcast signal received by an antenna is input to the tuner unit 1011. The tuner unit 1011 acquires the information (frequency, TS_ID) of a channel to be received from a CPU unit 1021 and outputs desired TS (transport stream) after switching the frequency. After the TS data is subjected to a descramble process by the MULTI2 cipher system (ARIB STD-B25, third chapter), it is demultiplexed to a PES (Packetized Elementary Streams) packet and section data. The PES packet includes an audio stream, a video stream, and the like of MPEG-2. Further, the section data includes PSI (Program Specific Information) for transmitting program information, Carrousel data for broadcasting data, and the like. The video stream data and the audio stream data are output to the decoder unit 1012, and the PSI section acquires SI (Service Information) necessary to acquire information as to the program and SI is stored in the CPU unit 1021.

(Decoder Unit, Display Unit, Amplifier Unit, Speaker Unit, and Selector Unit)

The video stream data is subjected to a video decode process described in "ARIB STD-B21, Sixth Chapter, 6.1, Video Decode Process and Output" by the decoder unit 1012 and output to and displayed on the display unit 1013. Further, the audio stream data is subjected to an audio decode process described in "ARIB STD-B21, Sixth Chapter, 6.2, Audio Decode Process and Output" and is output from the speaker unit 1015 through the amplifier unit 1014.

Further, the video data and the audio data replayed by the respective recording devices 102 and 103 are switched by the selector unit 1017 and output to the display unit 1013 and the amplifier unit 1014. The switch control of the selector unit 1017 is performed by the CPU unit 1021.

(External Operation Device and External Operation Reception Unit)

A user performs operations such as recording by the external operation device 104 such as a remote controller and receives a signal by the external operation reception unit 1016. The received signal is detected by the CPU unit 1021.

The CPU unit 1021 controls the communication control unit 1018 based on the received user operation, creates CEC messages such as a power supply control message and a recording message, and transmits the CEC messages to the recording devices 102 and 103.

On the contrary, the CEC messages transmitted from the recording devices 102 and 103 are received by the communication control unit 1018 and transmitted to the CPU unit 1021 for analysis.

(Communication Control Unit, EDID-ROM)

The communication control unit 1018 returns a response in response to a physical address acquisition request (for setting a 5V PWR line from low to high) from the recording devices 102 and 103 (when the acquisition is permitted, an HPD line is set from low to high, otherwise it remains low). When the acquisition is permitted, the recording devices 102, 103 perform a DDC communication with the EDID-ROM 1019 and acquire the physical address. The physical address is allocated to each of the HDMI terminals and stored in the EDID-ROM 1019. The HDMI terminals may have the EDID-ROMs 1019, respectively. However, if possible, one EDID-ROM may be switched and return a plurality of the physical addresses as shown in FIG. 2.

Subsequently, the recording devices 102 and 103 acquire logical addresses which they desire to acquire from the logical addresses allocated according to each device type (addresses "1", "2", "9" are allocated to the recording devices, refer to FIG. 15). As a procedure for acquiring the logical address, the recording devices 102 and 103 transmit a polling message by broadcast to the logical address which they desire to acquire (for example, "1"). When no response to the message returns from any device (when a message returns in the state of ACK bit=1), since other device does not acquire the logical address, the logical address is acquired. When a response returns (when a message returns in the state of ACK bit=0), on the other hand, the logical address has been acquired by other device. Thus, a logical address is acquired by repeating the same process as to the other logical addresses (for example, "2" and "9"). A structure of a header block/data block of the CEC message will be described later.

Further, the communication control unit 1018 has the following configuration to cause a device, which has failed to acquire a logical address, to acquire it again in addition to that the communication control unit 1018 performs the control for allocating the physical address and the logical address. More specifically, as shown in a detailed block diagram of FIG. 3, the communication control unit 1018 has the device connection/disconnection detecting unit 201, the acquired logical address number detecting unit 202, the logical-address-non-acquired device detecting unit 203, the device management table 204, and the logical address reacquisition controlling unit 205.

The device connection/disconnection detecting unit 201 detects connection and disconnection of a device by detecting the change of the 5V PWR line or insertion and removal of a connector into or from the HDMI terminal by a mechanical contact point. More specifically, the device connection/disconnection detecting unit 201 acts as connection detection means for detecting connection of a device and as a disconnection detection means for detecting disconnection of a device.

Since the physical address is determined in advance for each of the HDMI terminals, the device connection/disconnection detecting unit 201 can detect to which physical address a device is connected and a device of which physical address is disconnected. The device connection/disconnection detecting unit 201 can also detect how many physical addresses are used (how many devices are connected).

The acquired logical address number detecting unit 202 detects the number of devices which have acquired logical addresses among the devices connected on a CEC line, i.e., the number of already acquired (already allocated) logical addresses. The detection can be performed by transmitting a Polling message or a Give Physical Address message of CEC to logical addresses "1" to "14" and confirming responses thereto. However, since the logical address "0" is allocated to the television receiver and the logical address "15" is unregistered address, they are excluded.

The structure of the header block/data block of the CEC message will be explained using FIG. 4. All the data blocks and all the header blocks have the same basic structure of a 10-bit length. FIG. 4A shows the block structure. Information has 8 bits and stores data, operation codes, addresses, and the like. An EOM (End of Message) field and an ACK (Acknowledge) field as control bits exist in each one block. Whether or not there is a block to be transferred successively is set to EOM, and "0" shows that there is a block to be transferred successively and "1" shows a final block. ACK is a response from a transmission destination device, and when the response corresponds to a message, "0" is set, whereas when the response does not correspond to the message, "1" is set. Further, FIG. 4B shows the structure of the header block. In the header block, 8-bit information is divided to respective 4 bits, and Initiator and Destination are set to the respective 4 bits. A logical address on a message transmission side (the television receiver 101 in the embodiment) is set to Initiator, and a logical address on a reception side (for example, the recording devices 102, 103) is set to Destination.

Accordingly, when, for example, "9" is set to the Destination address as a logical address on the reception side in the Polling message described above, the ACK bit is set to "0" if there is a device which has acquired the logical address "9". Although, in reality, the CEC line is set to high on the Initiator side and is dropped to low on the Destination side, the above expression is employed. With this operation, it can be found that there is the device which has acquired the logical address "9". Likewise, when, for example, "9" is set to the Destination address as a logical address on the reception side in the Give Physical Address message described above, the following response is returned. When there is a device which has acquired the logical address "9", the ACK bit is set to "0", and the physical address of the device having the logical address "9" is returned as a response by a message. With this operation, the fact that the device, which has acquired the logical address "9", exists and the physical address thereof can be found.

When there is no device which has acquired the logical address, the ACK bit of the message block of the message is set to "1" (actually, the CEC line set to high on the Initiator side remains as it is).

Figure 5:
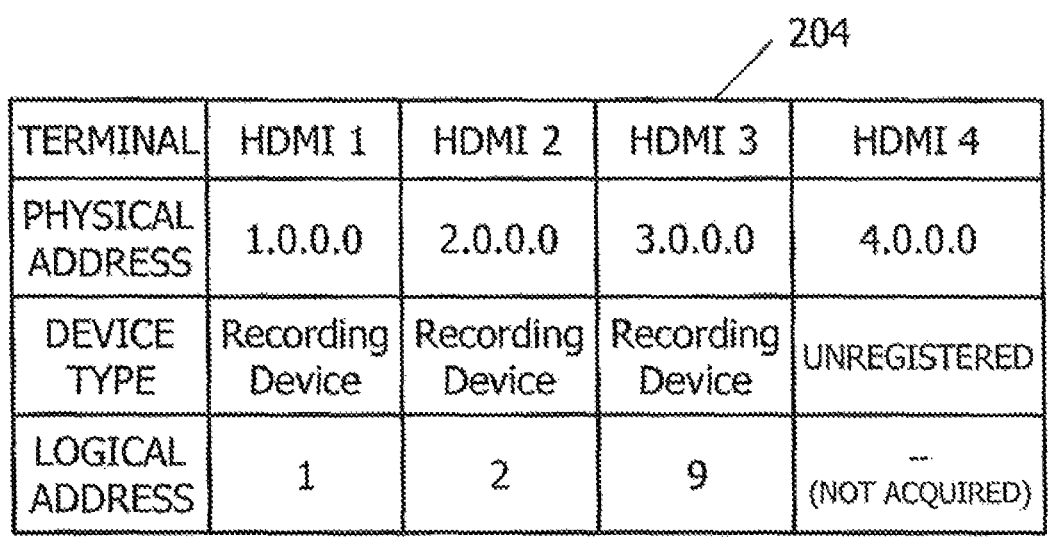
FIG. 5 is a view explaining a device management table for managing a logical address, a physical address, and a device type of a device connected to respective HDMI terminals.

The logical-address-non-acquired device detecting unit 203 detects a device which has not acquired a logical address. The detection process is performed by transmitting the Give Physical Address message to the logical addresses "1" to "14" and acquiring the physical addresses of the devices having acquired the logical addresses. With this process, the relation of correspondence between the physical addresses and the logical addresses of devices connected to each other can be found. A result of the detection is stored in a memory (storage means) as the device management table 204. FIG. 5 shows an example of the device management table 204. The example shows a case that recording devices are connected to each of four HDMI terminals, respectively. Since there are only three logical addresses for the recording devices, the fourth device cannot acquire a logical address.

It is assumed in the embodiment that when the number of connected devices detected by the device connection/disconnection detecting unit 201 exceeds the number of the acquired logical addresses detected by the acquired logical address number detecting unit 202, the devices which have not acquired logical address are detected. However, the acquired logical address number detecting unit 202 may be omitted and the devices which have not acquired the logical addresses may be detected regardless of the number of the acquired logical addresses.

When disconnection of a device is detected by the device connection/disconnection detecting unit 201, the logical address reacquisition controlling unit 205 causes the device which has not acquired the logical address to acquire a logical address again. The determination whether or not a device, which has not acquired a logical address, exists and the acquisition of the physical address of the device when the device exists can be performed referring to the device management table 204. The logical address reacquisition controlling unit 205 deasserts HPD to the physical address of the device which has not acquired the logical address (HPD is set to high again after it is set to low once).

(Logical Address Reacquisition Controlling Process)

Figure 6:
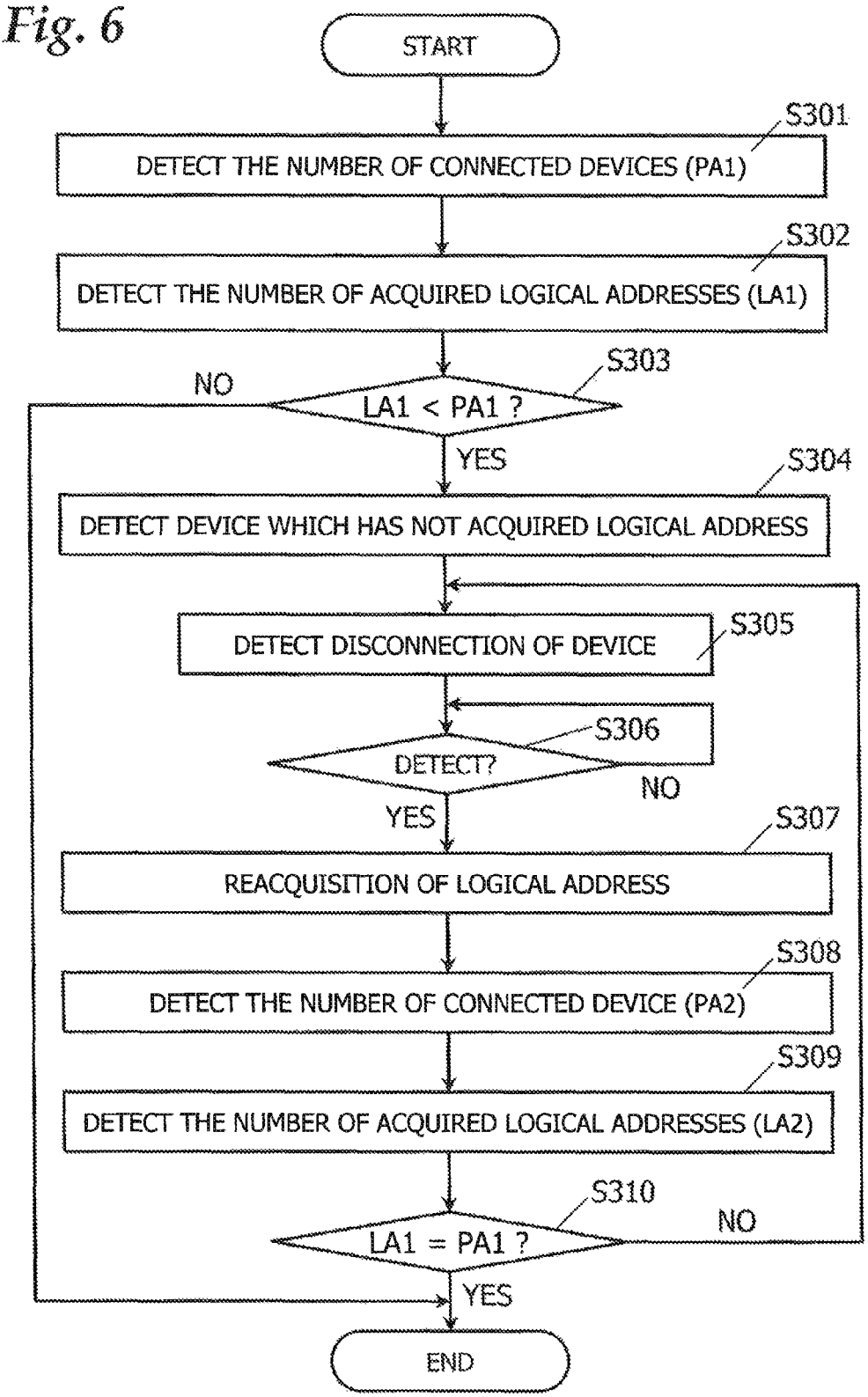
FIG. 6 is a flowchart showing a logical address reacquisition controlling process performed by a communication control unit according to the first embodiment.

Next, the flow of a process performed by the communication control unit 1018 when there is a device which has failed to acquire a logical address according to a device type will be explained referring to a flowchart of FIG. 6. The process will be started at a time when power is supplied to the television receiver 101, at a time when a new device is connected to the television receiver 101, or at predetermined intervals.

The communication control unit 1018 detects the number of devices (shown by PA1) connected to the HDMI terminals by the device connection/disconnection detecting unit 201 (step S301). The number of the devices can be detected based on the 5V PWR line or on the mechanical contact point as described above.

Next, the communication control unit 1018 detects the number of devices which have acquired logical addresses, in other words, the number of the acquired logical addresses (shown by LA1) by the acquired logical address number detecting unit 202 (step S302). The detection is performed using, for example, the Polling message or the Give Physical Address message of CEC as described above.

Then, the communication control unit 1018 compares the number of the connected devices PA1 with the number of the logical addresses LA1 (step S303). When PA1 is equal to LA1 (S303: NO), since all the connected devices have acquired logical addresses, the process is finished. When PA1 is larger than LA1 (S303: YES), since it is found that there is a device which has not acquired a logical address, the logical-address-non-acquired device detecting unit 203 specifies the device (step S304). The device can be specified by transmitting the Give Physical Address message as described above. A result of the detection is stored as the device management table 204 as shown in FIG. 5. In an example of FIG. 5, it can be found that a device connected to the HDMI terminal 4 (physical address 4.0.0.0) has not acquired a logical address. Note that when the number of logical addresses is detected making use of the Give Physical Address message at step S302, it is sufficient to make use of the result of step S302 without performing transmission at step S304 again.

Thereafter, the communication control unit 1018 waits for a device connected to an HDMI terminal to be disconnected (steps S305, S306). When the device connection/disconnection detecting unit 201 detects that the device is disconnected, the logical address reacquisition controlling unit 205 causes a device which has not acquired a logical address to acquire a logical address again (step S307). Since the device which has not acquired the logical address is specified at step S304 and stored in the device management table 204 (FIG. 5), a reacquisition control is performed to the device. In the example of FIG. 5, when it is detected that a device connected to any of the HDMI terminals 1 to 3 is disconnected, it can be found that a logical address is available. Thus, the logical address reacquisition controlling unit 205 causes a device, which is connected to the HDMI 4 terminal and has not acquired a logical address, to acquire a logical address again. The logical address can be acquired again by deasserting, for example, HPD (HPD is set to high again after it is set to low once).

Thereafter, the number of connected devices (shown by PA2) is detected again by the device connection/disconnection detecting unit 201 (step S308). Further, the number of acquired logical addresses (shown by LA2) is detected again by the acquired logical address number detecting unit 202 (step S309). Then, it is determined whether the number of connected devices PA2 is equal to the number of acquired logical addresses LA2 (step S310). When LA2 is less than PA2 (S310: NO), it can be found that there is still a device which has not acquired a logical address. This may occur when a device, which has not acquired a logical address, has a device type different from that of a device which is disconnected from a connection terminal, and reacquisition of a logical address fails. Otherwise, this may occur when there are two or more devices which have not acquired logical addresses even if reacquisition of a logical address is succeeded. In these cases, the process returns to step S305 and detects another disconnection of a device again so that the device which has not acquired a logical address can acquire a logical address again.

In contrast, when LA2 is equal to PA2 (S310: YES), since a device which has not acquired a logical address can acquire an available logical address and there is no device which has not acquired a logical address, the process is finished.

According to the first embodiment, it is possible to cause an audio visual device, which has failed to acquire a logical address and has not acquired any logical address, to acquire a logical address when it is made available. With this operation, the audio visual device can be placed in a state in which it can be subjected to the CEC control.

Second Embodiment

It is assumed also in a second embodiment of the present invention that a device is connected such that when the device has failed to acquire a logical address, it remains in a logical address non-acquired state without performing any process thereafter like the first embodiment.

Figure 7:
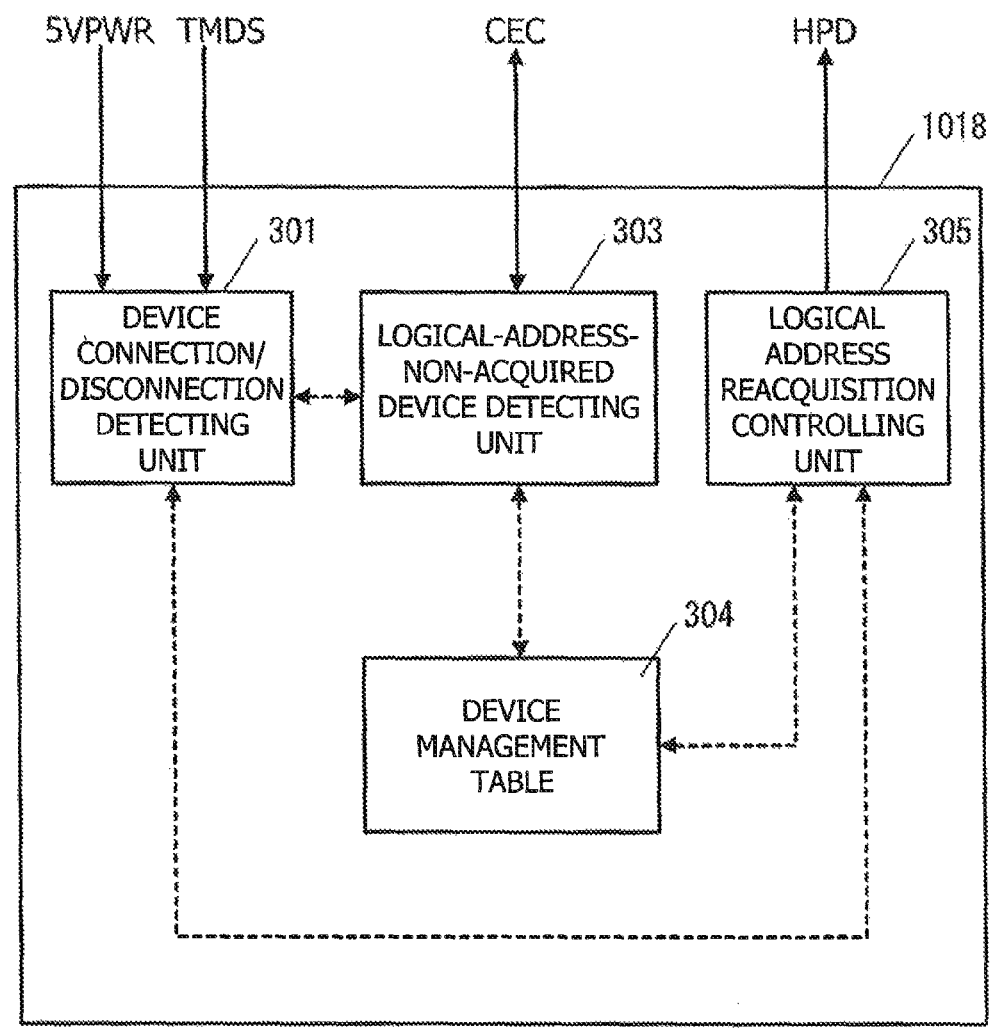
FIG. 7 is a block diagram explaining a communication control unit according to a second embodiment.

Since the basic configuration of a television receiver 101 in the second embodiment is the same as that of the first embodiment (FIGS. 1, 2), the explanation thereof is omitted. In the second embodiment, since only the configuration of a communication control unit 1018 is different from that of the first embodiment, the function block of the communication control unit 1018 is shown in FIG. 7. The communication control unit 1018 according to the second embodiment includes a device connection/disconnection detecting unit 301, a logical-address-non-acquired device detecting unit 303, a device management table 304, and a logical address reacquisition controlling unit 305. Since the processing of the respective function units are similar to those of the first embodiment, they will be explained referring to flowcharts of logical address reacquisition processes of FIGS. 8A and 8B.

Figure 8A:
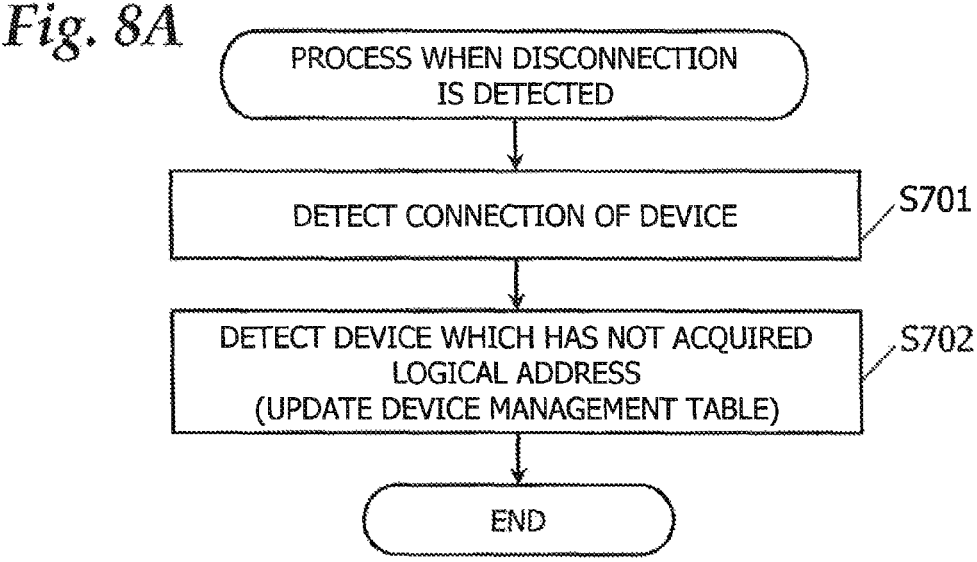
FIGS. 8A and 8B are flowcharts showing a logical address reacquisition controlling process performed by the communication control unit according to the second embodiment.
Figure 8B:
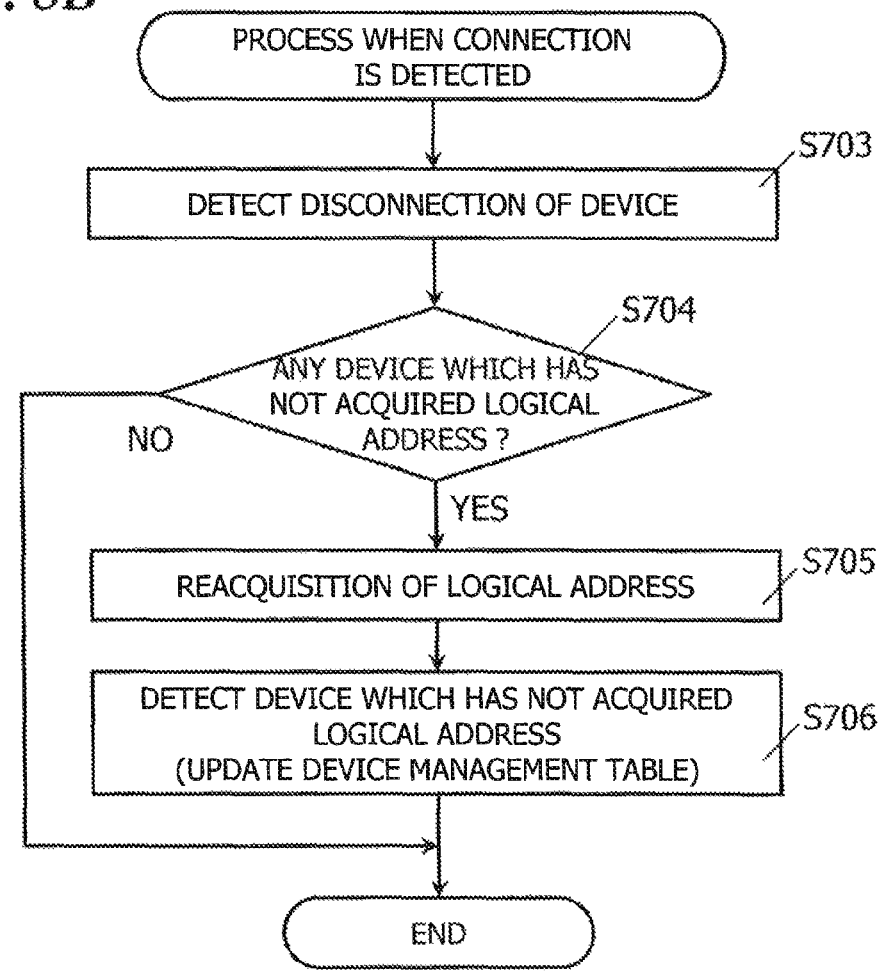

The device connection/disconnection detecting unit 301 detects a connection of a device to the television receiver 101 and a disconnection of a device from the television receiver 101. FIG. 8A shows the flowchart of the processes which are executed when the device connection/disconnection detecting unit 301 detects that a device is connected. FIG. 8B shows the flowchart of the processes which are executed when the device connection/disconnection detecting unit 301 detects that a device is disconnected.

First, a process performed when it is detected that a device is connected (FIG. 8A) will be explained. When the device connection/disconnection detecting unit 301 detects that a device is connected (step S701), the logical-address-non-acquired device detecting unit 303 detects whether or not a device which has not acquired a logical address exists and stores a result of the detection in the device management table 304. As described above, the logical addresses of each connected devices are previously checked and stored in the device management table 304. Detection of a device which has not acquired a logical address is performed by making use of the Give Physical Address message of CEC. The Give Physical Address message and a method of detecting a device which has not acquired a logical address making use of the message are as explained in the first embodiment.

As described above, each time it is detected that a device is connected, the device management table 304 is updated. That is, when it is detected that a device is disconnected, detection of a device which has not acquired a logical address is completed.

Next, a process, which is performed when it is detected that a device is disconnected (FIG. 8B), will be explained. When the device connection/disconnection detecting unit 301 detects that a device is disconnected (step S703), the logical address reacquisition controlling unit 305 determines whether or not there is a device which has not acquired a logical address referring to the device management table 304 (step S704). When there is a device which has not acquired a logical address (S704: YES), control is performed to cause the device to acquire a logical address again (step S705). The control can be performed by deasserting HPD like the first embodiment. Then, the logical-address-non-acquired device detecting unit 303 determines whether or not there is a device which has not acquired a logical address and updates the device management table 304 (step S706). This is because there are a case in which a logical address can be acquired and a case in which a logical address cannot be acquired by the logical address reacquisition control.

In the second embodiment, whether or not there exists a device which has not acquired a logical address is checked beforehand and stored in the device management table 304 as described above. Then, with the devices having no logical address stored in the device management table 304, the logical address reacquisition process is performed when a disconnection of a device is detected. It is possible to cause a device which has failed to acquire a logical address to acquire a logical address again when it is made available even by the processing method described above like the first embodiment.

Third Embodiment

It is assumed also in a third embodiment of the present invention that a device is connected such that when the device has failed to acquire a logical address, it remains in a logical address non-acquired state without performing any process thereafter like the first and second embodiments.

Figure 9:
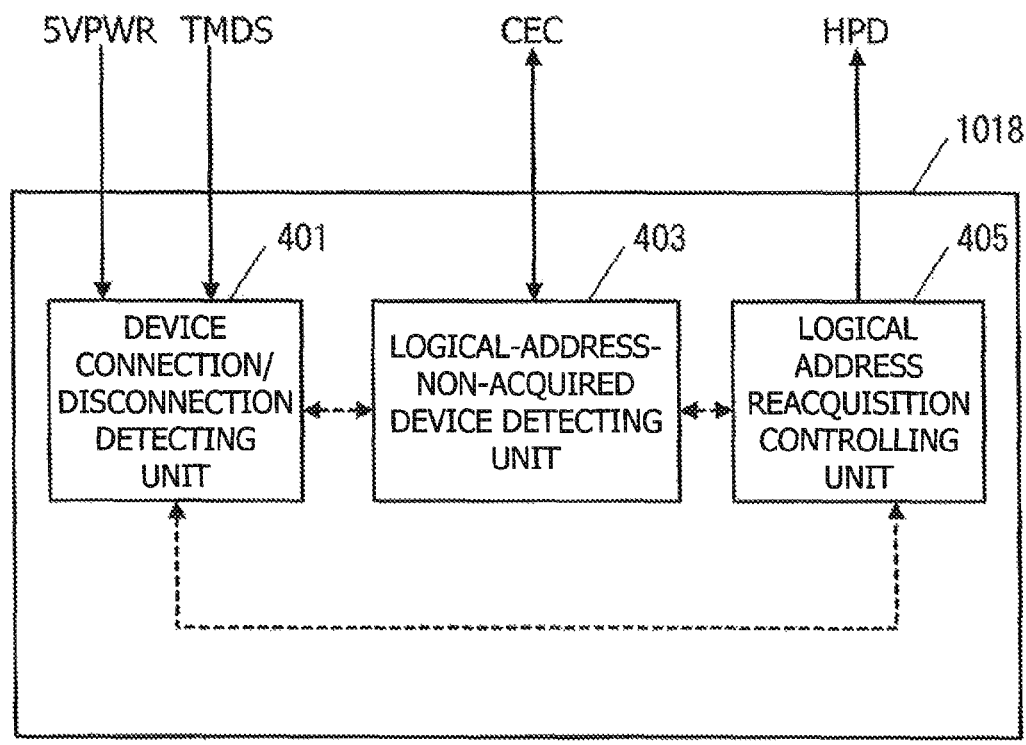
FIG. 9 is a block diagram explaining a communication control unit according to a third embodiment.
Figure 10:
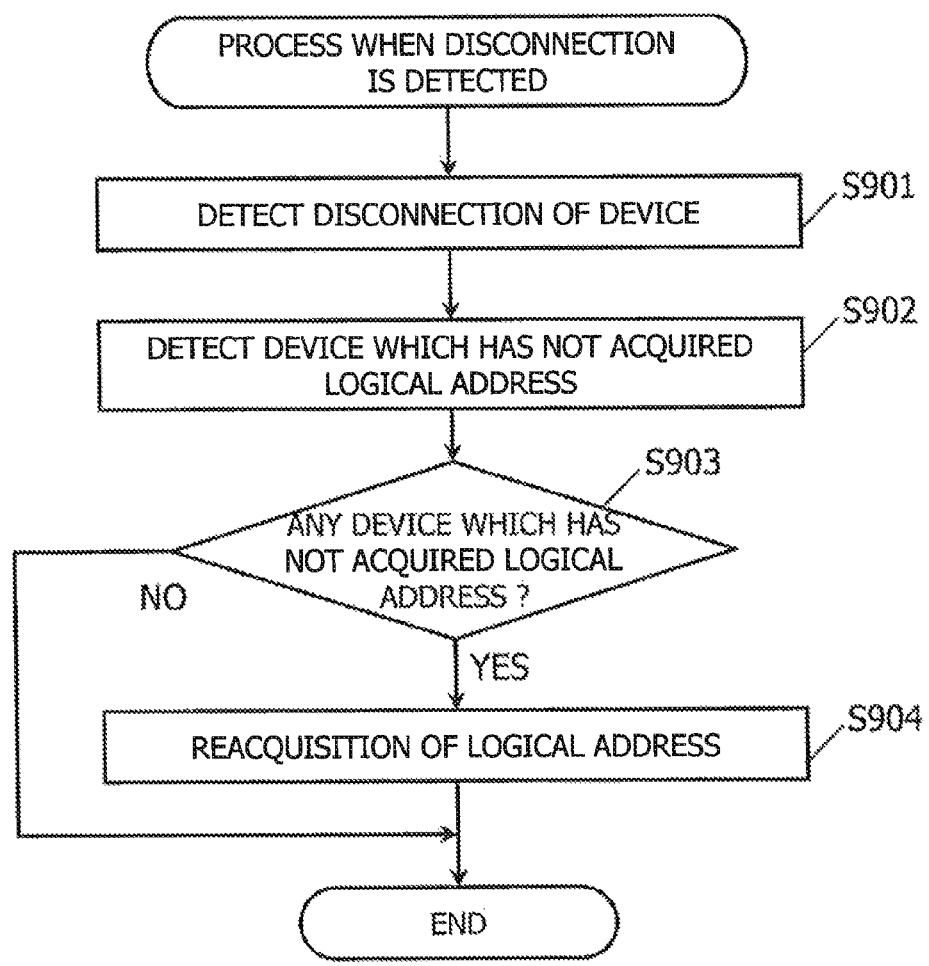
FIG. 10 is a flowchart showing a logical address reacquisition controlling process performed by the communication control unit according to the third embodiment.

Since the basic configuration of a television receiver 101 in the third embodiment is the same as that of the first embodiment (FIGS. 1, 2), the explanation thereof is omitted. In the third embodiment, since only the configuration of a communication control unit 1018 is different from that of the first embodiment, the function block of the communication control unit 1018 is shown in FIG. 9. The communication control unit 1018 according to the third embodiment includes a device connection/disconnection detecting unit 401, a logical-address-non-acquired device detecting unit 403, and a logical address reacquisition controlling unit 405. Since the processing of the respective function units are similar to those of the first embodiment, they will be explained referring to a flowchart of a logical address reacquisition process of FIG. 10.

Unlike the second embodiment, the third embodiment performs both detection of a device which has not acquired a logical address and a logical address reacquisition control when it is detected that a device is disconnected. When the device connection/disconnection detecting unit 401 detects that a device is disconnected (step S901), the logical-address-non-acquired device detecting unit 403 detects a device which has not acquired a logical address (step S902). A process for detecting the device which has not acquired the logical address is performed using the Give Physical Address message.

As a result of detection at step S902, when there is a device which has not acquired a logical address (S903: YES), the logical address reacquisition controlling unit 405 performs control for causing the device to acquire a logical address again (step S904). The control can be performed by deasserting HPD like the first embodiment.

It is possible to cause a device which has failed to acquire a logical address to acquire a logical address again when it is made available even by the processing method described above like the first and second embodiments.

Fourth Embodiment

Subsequently, a fourth embodiment of the present invention will be explained.
(Gist of Fourth Embodiment)

In the fourth embodiment, it is assumed that a connected device acquires a logical address "15" (unregistered address) when the device has failed to acquire a logical address because a plurality of devices having the same device type have already acquired logical addresses. The unregistered address is a logical address which does not specify a device type and does not correspond to "a logical address according to a device type" of the present invention. In the explanation of the fourth embodiment, "a logical address has not been acquired" means that a logical address according to a device type has not been acquired, unless otherwise specified. More specifically, explanation will be made supposing that even a case in which the logical address "15" that is the unregistered address has been acquired is included in the case that "no logical address has been acquired".

As to such a device, a television receiver 101 can transmit a CEC message to the logical address "15" and can detect whether or not a device which has not acquired a logical address exists by a response to the CEC message. When it is detected that another connected device is disconnected, control is performed to cause the device which has not acquired a logical address to acquire a logical address again.

With this operation, it is possible to cause the device which has failed to acquire a logical address and has acquired only the logical address "15", to acquire a logical address having the same device type again when it is made available. A CEC control according to a device type can be performed by causing the device to acquire the logical address according to the device type.

Since the basic configuration of the television receiver 101 according to the fourth embodiment is the same as that of the first embodiment (FIGS. 1, 2), the explanation thereof is omitted.

Figure 11:
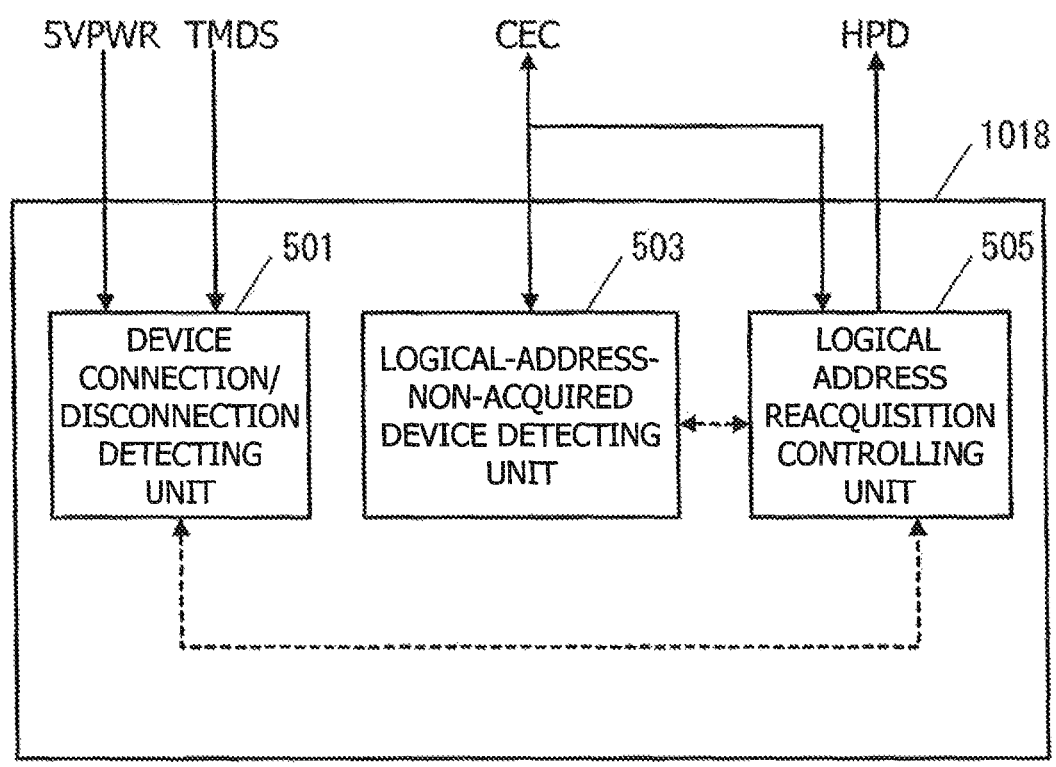
FIG. 11 is a block diagram explaining a communication control unit according to a fourth embodiment.
Figure 12:
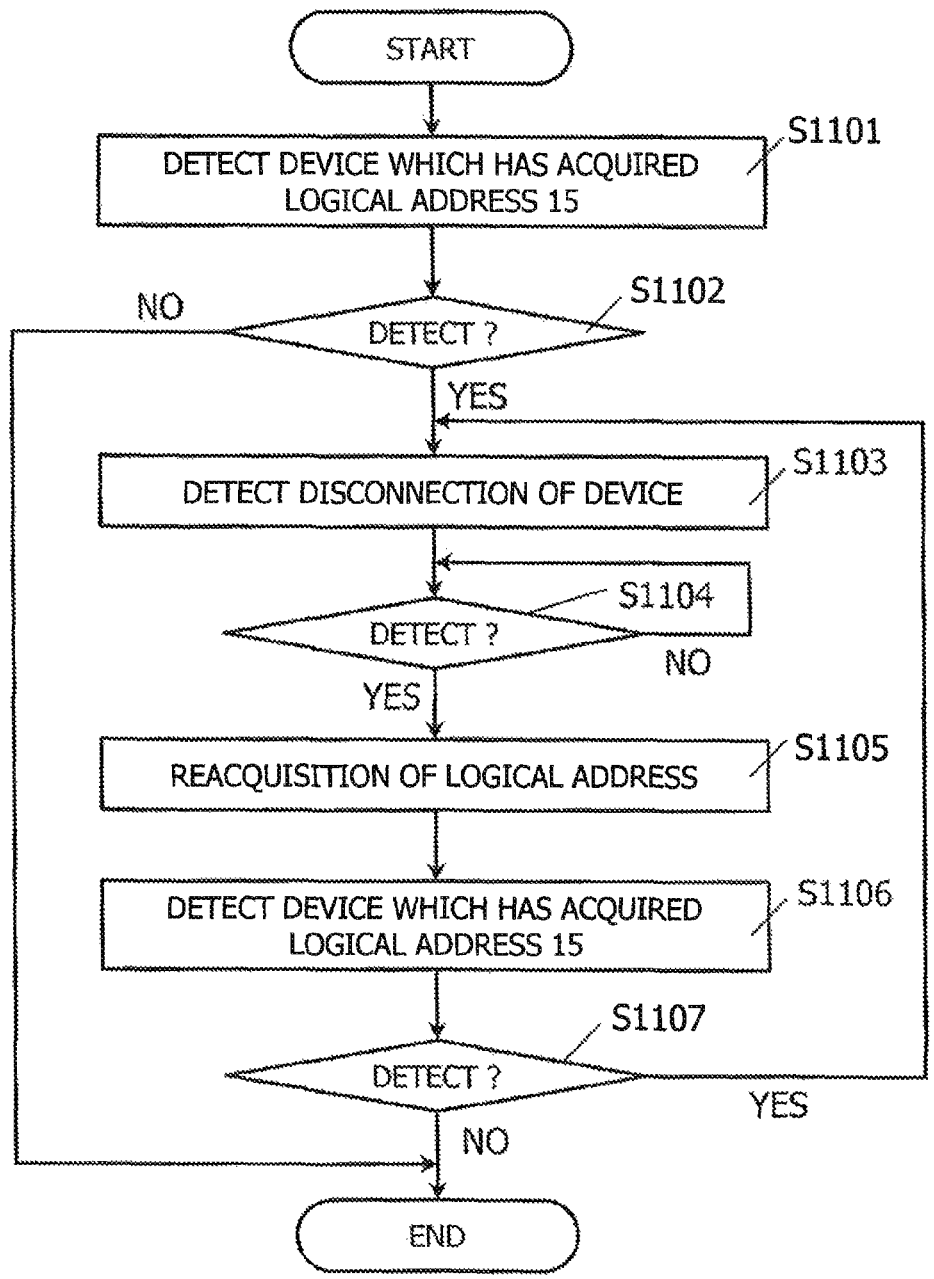
FIG. 12 is a flowchart showing a logical address reacquisition controlling process performed by the communication control unit according to the fourth embodiment.
Figure 13:
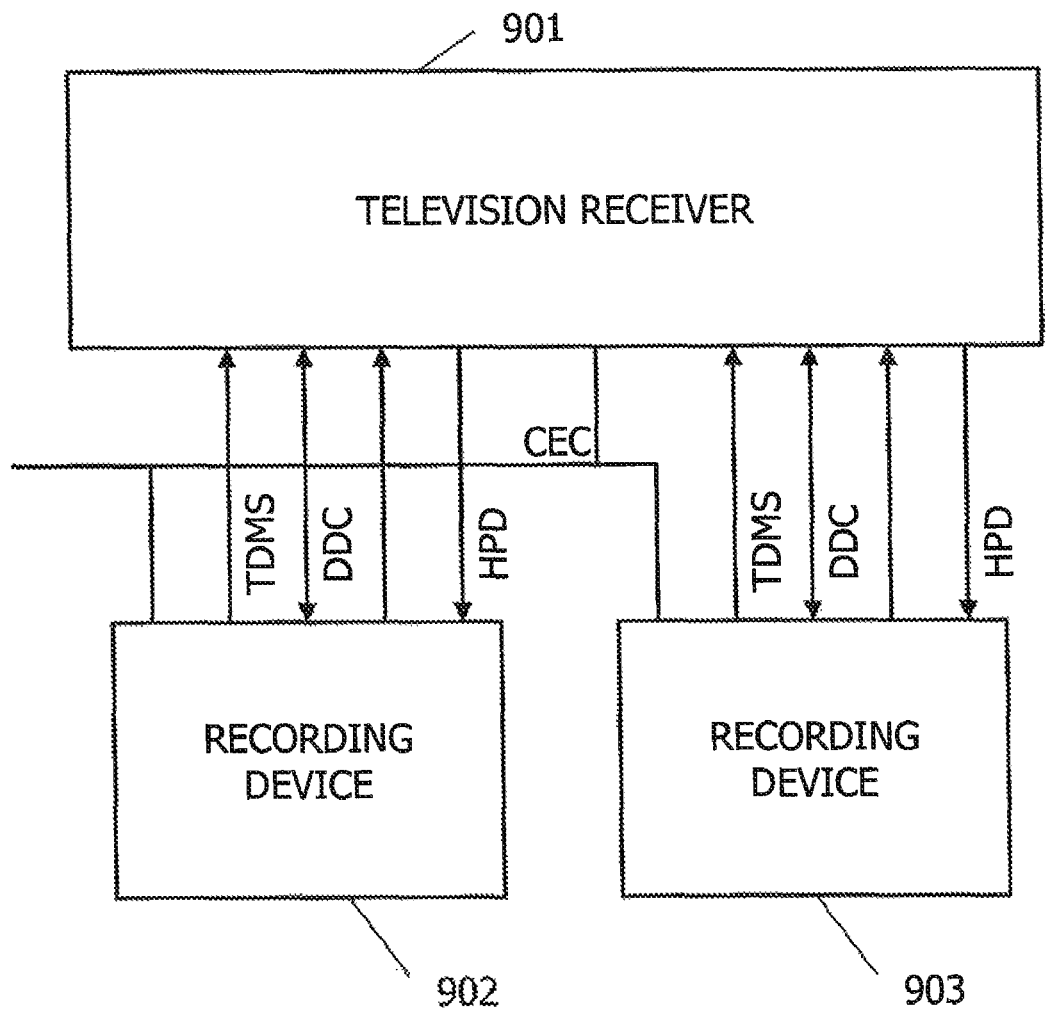
FIG. 13 is a block diagram explaining a conventional technology as to a communication in a system which is connected by HDMI.
Figure 14:
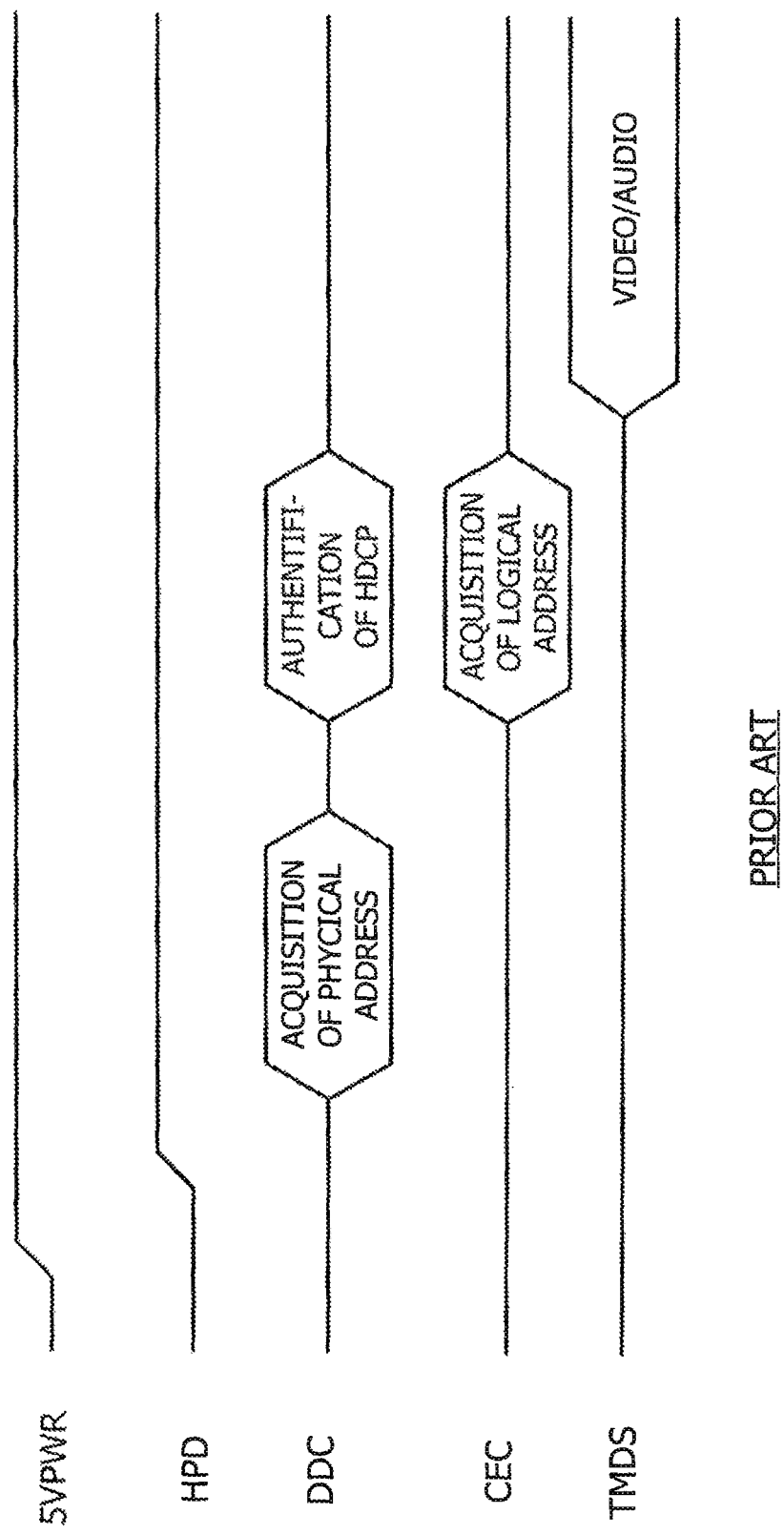
FIG. 14 is a timing chart explaining a conventional technology as to a communication in a system which is connected by the HDMI.

In the fourth embodiment of the present invention, since only a configuration of a communication control unit 1018 is different from that of the first embodiment of the present invention, the configuration will be explained referring to a block diagram of FIG. 11 and a flowchart of FIG. 12. As shown in FIG. 11, the communication control unit 1018 is composed of a device connection/disconnection detecting unit 501, a logical-address-non-acquired device detecting unit 503, and a logical address reacquisition controlling unit 505.

A process of a logical address reacquisition control performed by the communication control unit 1018 in the fourth embodiment will be explained referring to the flowchart of FIG. 12. The process will be started at a time when power is supplied to the television receiver 101, at a time when a new device is connected to the television receiver 101, or at predetermined intervals.

The communication control unit 1018 detects a device which has acquired the logical address "15", that is the unregistered logical address, from the devices connected on a CEC line by the logical-address-non-acquired device detecting unit 503 (step S1101). The detection can be performed by transmitting, for example, a Polling message and a Give Physical Address message of the CEC to the logical address "15" and confirming responses to the messages. When there is a device which has acquired the logical address "15", "0" is set to an ACK bit (actually, the CEC line which is set to high on an Initiator side is dropped to low on a Destination side). When there is no device which has acquired the logical address "15", the ACK bit of a message block is set to "1" (actually, the CEC line set to high on the Initiator side remains high).

In the fourth embodiment, the logical-address-non-acquired device detecting unit 503 can determine whether or not there is a device which has not acquired a logical address by transmitting a CEC message only once. That is, unlike the first to third embodiments, the device connection/disconnection detecting unit 501 does not need to detect which physical address is used. Further, in the fourth embodiment, since a device can be specified by the logical address "15", the logical-address-non-acquired device detecting unit 503 does not need to specify the physical address of the device. Accordingly, the Give Physical Address message and the Polling message are equally effective in the fourth embodiment.

When a logical address detecting unit 502 detects a device which has acquired the logical address "15" (S1102: YES), it is waited until a device connected to an HDMI terminal is disconnected (steps S1103, S1104). On the contrary, when the logical address detecting unit 502 does not detect a device which has acquired the logical address "15", it may retry the detection until it detects the device or may perform the detection again after a predetermined period of time passes.

Next, when the device connection/disconnection detecting unit 501 detects that a device connected to an HDMI terminal is disconnected, the logical address reacquisition controlling unit 505 causes the device which has not acquired a logical address to acquire a logical address again (step S1105). The device can be caused to acquire the logical address again by, for example, deasserting HPD as explained in the first embodiment. Since the CEC control can be performed in the fourth embodiment because a device to be controlled has acquired the logical address "15", the device can also acquire a logical address by turning on a power supply of the device again after it is turned off by the CEC message.

Thereafter, the logical-address-non-acquired device detecting unit 503 detects a device which has acquired the logical address "15" again (step S1106). When a device which has acquired the logical address "15" is not detected (S1107: NO), the process is finished because the device has acquired a logical address. In contrast, when a device which has acquired the logical address "15" is detected again (S1107: YES), the process returns to step S1103 at which whether or not a device which is connected to an HDMI terminal is disconnected is detected again. This is because a logical address according to a device type cannot be acquired since a device having acquired the logical address "15" has a device type different from that of a disconnected device.
(Others)

Although only the configuration, in which the television receiver 101 includes the communication control unit 1018, has been explained above, the communication control unit

1018 may be assembled to a unit other than the television receiver 101. The communication control unit 1018 may be assembled to other unit such as a tuner unit.

Further, although the above explanation has been made as to the audio visual device system based on the HDMI standard as an example, the audio visual device system to which the present invention can be applied is not limited to an HDMI system. The application of the present invention is not limited to the HDMI system The present invention can be applied to any other audio visual device system in which logical address is allocated to devices according to their device type, the number of logical addresses is limited a device, and there is a chance that a device may fail to acquire a logical address according to a device type.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-115997, filed on Apr. 25, 2008, which is hereby incorporated by reference herein in its entirety.

What is claimed is:

1. A communication control device comprising:
   a detection unit that detects whether or not a first device and the communication control device are disconnected; and
   a control unit that performs a predetermined process if the first device and the communication control device are disconnected, wherein the predetermined process includes a process for allowing a second device to obtain a predetermined address by controlling, using a command, a power source of the second device, and the predetermined address includes an address obtained by the first device if the first device and the communication control device are connected.

2. The communication control device according to claim 1, wherein the predetermined process is not performed if the first device and the communication control device are not disconnected.

3. The communication control device according to claim 1, wherein the predetermined address is not obtained by the second device if the first device and the communication control device are not disconnected.

4. The communication control device according to claim 1, wherein the communication control device can control the second device by using the predetermined address if the predetermined address is obtained by the second device.

5. The communication control device according to claim 1, wherein the predetermined process includes a process for turning on the power source of the second device using a command.

6. The communication control device according to claim 1, wherein the second device includes a device that does not obtain an address relating to a device type of the second device.

7. The communication control device according to claim 1, wherein the predetermined address includes an address relating to a recording device.

8. The communication control device according to claim 1, wherein the communication control device and the second device are connected via a HPD (Hot Plug Detect) line.

9. The communication control device according to claim 1, wherein the communication control device includes a device that can transmit EDID (Extended Display Information Data) to an external device.

10. The communication control device according to claim 1, further comprising a unit that detects whether or not the second device has an address relating to a device type of the second device if the communication control device and the second device are connected.

11. The communication control device according to claim 1, wherein the communication control device conforms to HDMI (High-Definition Multimedia Interface) standard.

12. A method for controlling a communication control device comprising:
    detecting whether or not a first device and the communication control device is are disconnected; and
    performing a predetermined process if the first device and the communication control device are disconnected, wherein the predetermined process includes a process for allowing a second device to obtain a predetermined address by controlling, using a command, a power source of the second device, and the predetermined address includes an address obtained by the first device if the first device and the communication control device are connected.

13. The communication control device according to claim 1, wherein the communication control device includes a television device.

14. The communication control device according to claim 1, wherein the predetermined process includes a first process and a second process, the first process includes a process for turning off the power source of the second device using a command, and the second process includes a process for turning on the power source of the second device using a command after the first process is performed.

15. The communication control device according to claim 1, wherein a command for controlling the power source of the second device includes a CEC message.

* * * * *